(No Model.) 2 Sheets—Sheet 1.

H. C. AGAN.
SAW SHARPENING MACHINE.

No. 264,021. Patented Sept. 5, 1882.

Witnesses—
Wm. C. Raymond.
D. M. Schell.

Inventor—
Hiram C. Agan
Jer. Dull, L. a asst Hy
his Attys (No Model.) 2 Sheets—Sheet 2.

H. C. AGAN.
SAW SHARPENING MACHINE.

No. 264,021. Patented Sept. 5, 1882.

WITNESSES—
Wm. E. Raymond
D. M. Schell

INVENTOR—
Hiram C. Agan
per Duell, Lassett Hey
his Attys

UNITED STATES PATENT OFFICE.

HIRAM C. AGAN, OF FAYETTEVILLE, NEW YORK, ASSIGNOR OF ONE-HALF TO COLLIN, ARNOLD & SISSON, OF SAME PLACE.

SAW-SHARPENING MACHINE.

SPECIFICATION forming part of Letters Patent No. 264,021, dated September 5, 1882.

Application filed March 11, 1882. (No model.)

*To all whom it may concern:*

Be it known that I, HIRAM C. AGAN, of Fayetteville, in the county of Onondaga, in the State of New York, have invented new and useful Improvements in Machines for Sharpening Saws, of which the following, taken in connection with the accompanying drawings, is a full, clear, and exact description.

This invention relates to certain novel devices designed for holding circular saws in the various positions required to bring their teeth at the proper angle against a grinding-wheel to sharpen them and render the teeth uniform in length and pitch.

Figure 1:
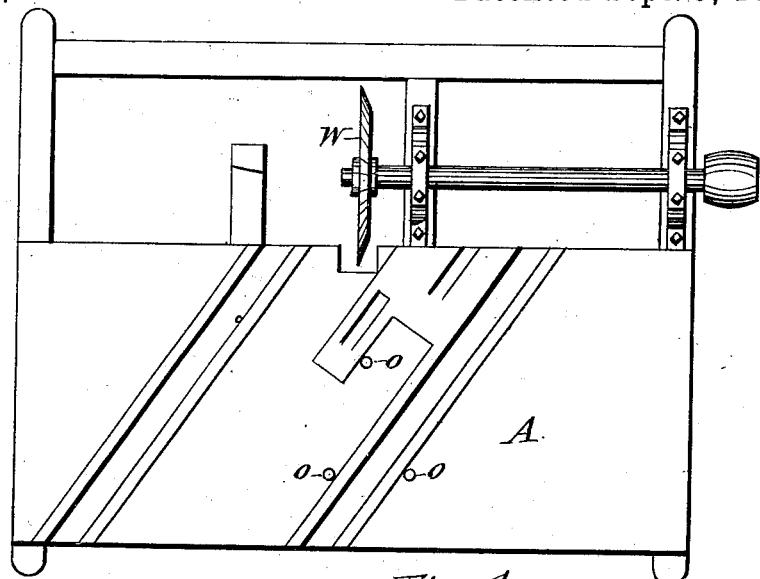
Figure 2:
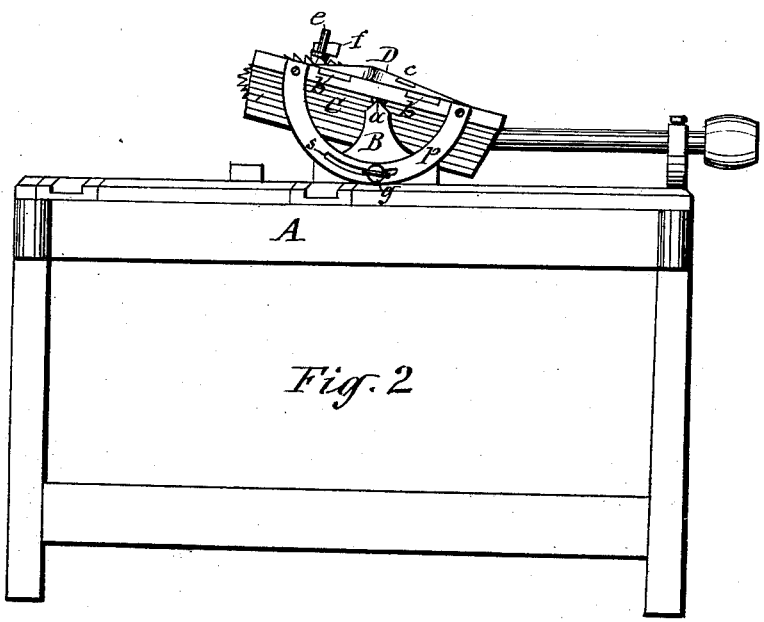
Figures 3, 4:
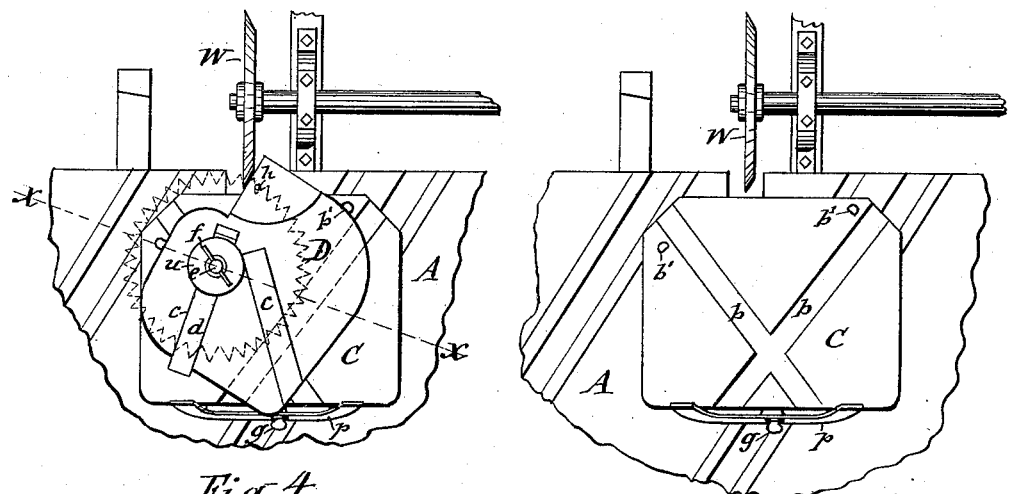
Figure 6:
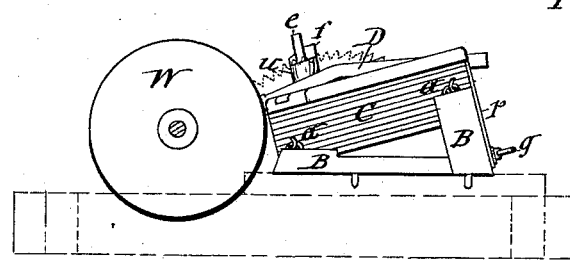
Figure 7:
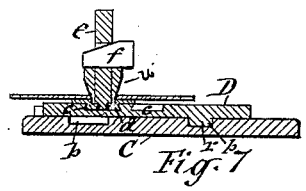
Figure 5:
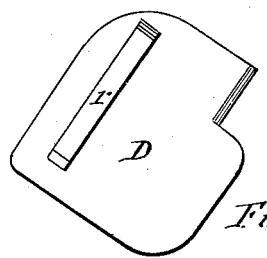
Figure 8:
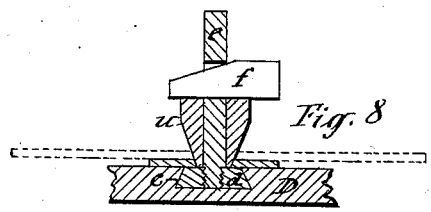

The invention is fully illustrated in the accompanying drawings, wherein Figure 1 is a top view of the table or frame on which is journaled the grinding-wheel, and which supports the appliances for holding the saws against said grinding-wheel. Fig. 2 is a front view of the same with one of the saw-holding devices applied thereto. Fig. 3 is a plan view of the device which holds a circular crosscut-saw at a proper angle to produce the requisite bevel on the edge of the teeth, and also serves as a guide for carrying the saw to and from the grinding-wheel. Fig. 4 is a top view of the plate on which the saw is clamped, and by which it is carried to and from the grinding-wheel. Fig. 5 is a view of the under side of the aforesaid plate. Fig. 6 is a side view of the devices for holding a circular crosscut-saw in the operation of sharpening. Fig. 7 is a transverse section on line $x\ x$ in Fig. 4, and Fig. 8 is an enlarged sectional view of the saw-clamping device.

Similar letters of reference indicate corresponding parts.

A represents a table or frame, on which is journaled in a vertical position the grinding-wheel W, said grinding-wheel having a rearwardly-beveled periphery, as shown.

B designates the base which supports the saw-guiding and saw-sustaining devices. Said base is provided on its bottom with dowel-pins, which engage with holes $o\ o$ in the top of the table A, thereby holding the base B firmly in place. The top of the aforesaid base is provided with rocker-bearings $a\ a$, which are in line with the plane of the grinding-wheel W and inclined toward said wheel.

Upon the rocker-bearings $a\ a$ is mounted and hinged in a suitable manner a plate, C, which is thus sustained in an inclined position toward the grinding-wheel, and capable of rocking laterally on the bearings $a\ a$.

To the elevated end of the plate C is secured a pendent semicircular plate, $p$, which lies across the end of the base B, and is provided with a slot, $s$, through which passes a set-screw, $g$, connected with the base B. The top of the plate C is provided with two diagonal grooves or ways, $b\ b$, disposed in opposite directions, and upon the said plate is placed another plate, D, which is adapted to slide thereon, and is guided by a tongue, $r$, on its under side, sliding in one of the grooves $b$ in the plate C. A stop-pin, $b'$, secured to the plate C at the lower end of the grooves $b\ b$, determines the approach of the plate D toward the grinding-wheel, and thus regulates the application of the saw to said grinding-wheel in the process of sharpening. The upper face of the plate D is provided with two convergent grooves or ways, $c\ c$, preferably of dovetail shape in cross-section, and in said ways is fitted to slide endwise a plate, $d$, which is provided with a screw-threaded eye or socket, in which is screwed a post, $e$. This post passes through the eye of the saw to be sharpened, and over the post is slipped an inverted conical sleeve, $u$, the small end of which is forced into the eye of the saw by means of a key, $f$, passing through a slot in the post, the entrance of the sleeve $u$ into the eye of the saw serving to secure the saw concentrically on the post. The lower end of the plate D is provided with an upward projecting pin or shoulder, $h$, arranged in such relative position as to rest against the back edge of the saw-tooth to be ground, and thereby firmly hold said tooth against the grinding-wheel. After the sharpening of each tooth the plate D is retracted to liberate the saw-tooth from the grinding-wheel, then the saw is turned on its axis to bring the succeeding tooth to rest against the shoulder $h$, and then the plate D, with the saw, is pushed forward again to apply said tooth against the grinding-wheel, the stop-pin $b'$ limiting the approach of the plate D toward the grinding-wheel, as aforesaid. The proper bevel on the edge of the tooth is obtained by tilting the described plate C on the rocker-bearings $a\ a$ and clamping it in position by the set-screw $g$. After one edge of the teeth is thus sharpened the plate C is tilted in the opposite direction and secured as aforesaid, and another plate D, possessing all of the characteristics of the already-described plate D, but arranged in converse order, is placed upon the plate C and guided in the other diagonal way $b$. This arrangement brings the saw into the required position on the grinding-wheel to sharpen the other edge of the teeth.

Having described my invention, what I claim as new, and desire to secure by Letters Patent, is—

1. In combination with the grinding-wheel W, the base B, having rocker-bearings $a\ a$ in line with the plane of the wheel W and inclined toward said wheel, the plate C, mounted on said bearings and provided with ways $b\ b$, the plate D, sliding on the plate C and guided by the ways $b$, and provided with convergent ways $c\ c$, and the slide $d$, provided with the post $e$ and key $f$, as described and shown, for the purpose set forth.

2. In combination with the grinding-wheel W, the base B, having rocker-bearings $a\ a$ in line with the plane of the wheel W and inclined toward said wheel, the plate C, mounted on said bearings, and provided with ways $b\ b$ and with stops $b'$, the semicircular plate $p$, secured to the plate C and provided with the slot $s$, the set-screw $g$, the plate D, sliding on plate C and guided by the ways $b$, and provided with convergent ways $c\ c$ and with a stop or shoulder, $h$, and the slide $d$, provided with the post $e$, conical sleeve $u$, and key $f$, all as described and shown, for the purpose specified.

In testimony whereof I have hereunto signed my name and affixed my seal, in the presence of two attesting witnesses, at Syracuse, in the county of Onondaga, in the State of New York, this 20th day of February, 1882.

HIRAM C. AGAN. [L. S.]

Witnesses:
EDWARD COLLIN,
C. H. DUELL.